(12) United States Patent
Haase et al.

(10) Patent No.: US 7,728,957 B2
(45) Date of Patent: Jun. 1, 2010

(54) DEVICE AND METHOD FOR OPTICAL DISTANCE MEASUREMENT

(75) Inventors: Bjoern Haase, Stuttgart (DE); Joerg Stierle, Waldenbuch (DE); Peter Wolf, Leinfelden-Echterdingen (DE); Cedric Pahud, Morges (CH); Kai Renz, Leinfelden-Echterdingen (DE); Clemens Schulte, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 10/593,595

(22) PCT Filed: Jul. 1, 2005

(86) PCT No.: PCT/EP2005/053127

§ 371 (c)(1),
(2), (4) Date: Sep. 21, 2006

(87) PCT Pub. No.: WO2006/024566

PCT Pub. Date: Mar. 9, 2006

(65) Prior Publication Data

US 2007/0211329 A1    Sep. 13, 2007

(30) Foreign Application Priority Data

Sep. 2, 2004  (DE) ............... 10 2004 042 466

(51) Int. Cl.
*G01C 3/08* (2006.01)
(52) U.S. Cl. ..................... 356/5.1; 356/3.01
(58) Field of Classification Search ....... 356/3.01–5.15, 356/614, 623
See application file for complete search history.

(56) References Cited

U.S. PATENT DOCUMENTS

| 4,825,091 | A | 4/1989 | Breyer et al. |
| 4,856,893 | A | 8/1989 | Breen |
| 5,815,251 | A | 9/1998 | Ehbets et al. |
| 6,031,600 | A | 2/2000 | Winner et al. |
| 6,031,601 | A * | 2/2000 | McCusker et al. ......... 356/5.01 |
| 6,236,035 | B1 | 5/2001 | Saar et al. |
| 6,369,879 | B1 | 4/2002 | Pedersen |
| 2001/0046317 | A1 | 11/2001 | Kamon et al. |
| 2006/0201006 | A1* | 9/2006 | Burlingham et al. .......... 33/284 |
| 2006/0244746 | A1* | 11/2006 | England et al. ............. 345/419 |

FOREIGN PATENT DOCUMENTS

DE    37 03 422    8/1988

(Continued)

*Primary Examiner*—Isam Alsomiri
(74) *Attorney, Agent, or Firm*—Michael J. Striker

(57) ABSTRACT

The invention relates to a device for optical distance measurement, in particular a device functioning in accordance with the phase measurement principle, having at least one transmission unit (12) equipped with at least one light source (22, 24) for transmitting modulated optical measurement radiation (16) toward a target object (20), and having a reception unit (18) for receiving the optical measurement radiation (17) returning from the target object (20).

According to the present invention, the device has means (51, 55, 68) that enable a measurement of distances from a target object (20') by means of a triangulation method.

The invention also relates to a method for optical distance measurement in which it is possible to switch back and forth between a phase measurement method for determining a distance of a distance measuring device from a target object (20, 20') and a triangulation method for determining this distance.

12 Claims, 2 Drawing Sheets

FOREIGN PATENT DOCUMENTS

| | | |
|---|---|---|
| DE | 42 07 169 | 9/1993 |
| DE | 42 17 423 | 2/1994 |
| DE | 43 16 348 | 11/1994 |
| DE | 43 41 645 | 6/1995 |
| DE | 296 15 514 | 1/1997 |
| DE | 196 16 038 | 10/1997 |
| DE | 198 11 550 | 9/1999 |
| DE | 102 10 340 | 9/2003 |
| GB | 2052021 A * | 1/1981 |
| GB | 2 336 493 | 10/1999 |
| WO | 00/50842 | 8/2000 |

* cited by examiner

DEVICE AND METHOD FOR OPTICAL DISTANCE MEASUREMENT

CROSS REFERENCE TO A RELATED APPLICATION

The invention described and claimed hereinbelow is also described in German Patent Application DE 10 2004 042 466.7 filed on Sep. 2, 2004. This German Patent Application provides the basis for a claim of priority of invention under 35 U.S.C. 119(a)-(d).

BACKGROUND OF THE INVENTION

The present invention relates to a device for optical distance measurement and to a method for optical distance measurement by means of phase modulation.

Optical distance measuring devices as such have been known for a long time and have in the meantime also been commercially marketed in a wide variety of embodiment forms. These devices emit a modulated light beam, which is oriented toward the surface of a target object to be measured, whose distance from the device is to be determined. Part of the light reflected against or scattered back by the target surface is detected again by the measuring device and used to determine the desired distance.

The application field of such distance measuring devices generally includes distances in a range of typically between a few centimeters and several hundred meters.

Depending on the distances to be measured and the reflectivity of the target object, different demands are placed on the light source, the quality of the measurement beam, and the detector.

Depending on the orientation of the transmission and reception conduits necessarily provided in the device, the optical distance measuring devices known from the prior art can essentially be divided into two categories. On the one hand, there are devices in which the transmission conduit is situated a certain distance apart from the reception conduit so that the respective optical axes are parallel to each other. On the other hand, there are monoaxial measuring devices in which the reception conduit is coaxial to the transmission conduit.

The biaxial measurement systems have the advantage of not requiring a complex beam splitting to select out the returning measurement signal, thus permitting better suppression of an optical crosstalk, for example, from the transmission conduit directly into the reception conduit.

On the other hand, biaxial distance measuring devices have among other things, the disadvantage that in the range of shorter measurement distances, detection problems can arise due to the presence of a parallax. The projection of the target object onto the detector surface of the measurement receiver integrated into the unit, which projection is still unambiguously situated on the detector at large target distances, begins to creep away from the optical axis of the reception branch as the measurement distance decreases, and also experiences a variation in the beam cross section in the detector plane.

This means that without further steps being taken in the unit, in the close detection range, i.e. for a short distance between the target object and the measuring device, the measurement signal can approach zero.

DE4316348A1 has disclosed a device for distance measurement, having a visible measurement beam generated by a semiconductor laser whose reception device includes a light guide whose outlet is connected to an optoelectronic converter. The light entry surface into the fiber of the light guide is situated in the projection plane of the reception lens of this device for large object distances and can be shifted out of this position laterally in relation to the optical axis.

In this way, measurement beams that arrive into the reception lens at ever greater inclination at short object distances can be guided by the device according to DE4316348A1 onto the light-sensitive surface of the detector through tracking by the optical fibers, without requiring spatial movement of the detector.

The required electronic control of the tracking and the use of additional, in particular moving parts in the distance measuring device according to DE4316348A1 entail a not insignificant amount of effort, which increases the complexity and therefore the cost and susceptibility of such a system to malfunction.

There are also known optoelectronic distance sensors that function in accordance with the so-called triangulation principle. DE3703422A1 has disclosed such an optoelectronic distance sensor functioning according to the triangulation principle, which has at least one first pilot beam source 7 that makes the projection beam path of the sensor visible, which is inclined in relation to the measurement beam. In sensors of this kind, a position-sensitive detector is used, which is offset in relation to the transmission direction. Since the incidence point of the measurement beam reflected by the target object is a function of the distance of the detector from the target object, its position can be used to calculate the distance between the detector and the target object.

DE29615514U1 has disclosed an electronic distance measuring device that has a flat measuring bar, which is situated on the side of the housing of the measuring device and can be slid in relation to it. The flat measuring bar serves to establish a reference plane spaced a definite distance apart from the measurement plane of the distance measuring device; the measuring device is then able to detect small distances very precisely by measuring a measurement value greater than the minimum and then subtracting the distance between these two planes to determine the measurement value. In a suitable fashion, the subtraction of this distance between the planes occurs automatically in that the degree to which the flat measuring bar extends out from the measuring device housing is measured at the push of a button and can be automatically taken into account. In this way, the measuring device according to DE29615514U1 is able to determine very small distances with a high degree of precision, even when using the phase-comparison method to determine the desired distance.

Triangulation sensors of this kind are typically used in industrial sensors for distance measurement, for example in machine tools to determine short movement distances of a moving part of such a machine tool. The triangulation measurement method only permits measurements in a small measurement range, but is able to achieve high levels of precision.

SUMMARY OF THE INVENTION

The device for optical distance measurement according to the present invention, in particular a device of this kind that functions in accordance with the phase measurement principal, has at least one transmitter unit for transmitting modulated optical measurement radiation toward a target object. Such a device also has a reception unit for receiving the optical radiation returning from the target object. By comparing and evaluating physical dimensions of the transmitted measurement beam with those of the received measurement beam, for example by means of evaluating the phase shift imparted to the measurement beam, it is possible to calculate the distance between the device and the target object.

The device for optical distance measurement according to the present invention advantageously has means that permit it to also determine the distance to the target object by means of a triangulation method.

In this way, it is possible to obtain very precise data about the distance between the device and a target object, even in the short distance range. In particular, this advantageously makes it possible to bypass the detection problems that arise when using a phase measurement method in the short distance range.

problems that arise when using a phase measurement method in the short distance range.

Such a method according to the present invention thus enables an exact distance determination both in the range of large object distances between the distance measuring device and a target object, for example in the range of typically 100 m, and also in the range of very short distances, i.e. those approaching zero, for example.

The device for optical distance measurement according to the present invention thus advantageously enables a method for determining distances in which it is possible to switch back and forth between a phase measurement method for determining a distance of a measuring object from a target object and a triangulation method for determining such a distance.

Advantageous embodiments and modifications of the device according to the present invention ensue from the defining characteristics disclosed in the dependent claims.

Advantageously, the same light source is used for the triangulation measurement as is used for the distance measurement according to the time delay method, in particular for the distance measurement using the phase measurement principle. In this manner, it is possible to execute both types of distance measurement with one and the same transmission conduit and to simply provide the reception conduit with different detectors for the phase measurement and the triangulation.

For the detection of the triangulation signal, a position-sensitive sensor is used, for example a planar detector in the form of a CCD element or also a linear detector such as a row of diodes. In addition, the means for determining a desired distance to a target object by means of the triangulation method include at least a set of projection optics that focus the measurement beam returning from the target object onto the position-sensitive sensor.

The device according to the present invention can advantageously be integrated into a measuring device that is additionally equipped, for example, with a mechanical, sliding measurement stop, thus also permitting measurement of a distance approaching zero through establishment of a mechanical offset between the measuring device and the target object.

Other advantageous embodiments of the device and method according to the present invention ensue from the description below.

The device and method according to the present invention advantageously enable very precise determination of both very large and very small distances to a target object.

In particular, the optical distance measurement device according to the present invention makes it possible to switch back and forth between a phase measurement method particularly for determining large distances to a measurement object and a triangulation method particularly for determining very small distances.

An exemplary embodiment of the device according to the present invention and of the optical distance measurement method underlying the present invention are shown in the drawings and will be explained in detail in the description that follows. The figures in the drawings, their description, and the claims contain numerous defining characteristics in combination. Those skilled in the art will also consider these defining characteristics individually and unite them in other meaningful combinations that are also viewed as having been disclosed in the specification.

DESCRIPTION OF THE PREFERRED EMBODIMENTS

Figure 1:
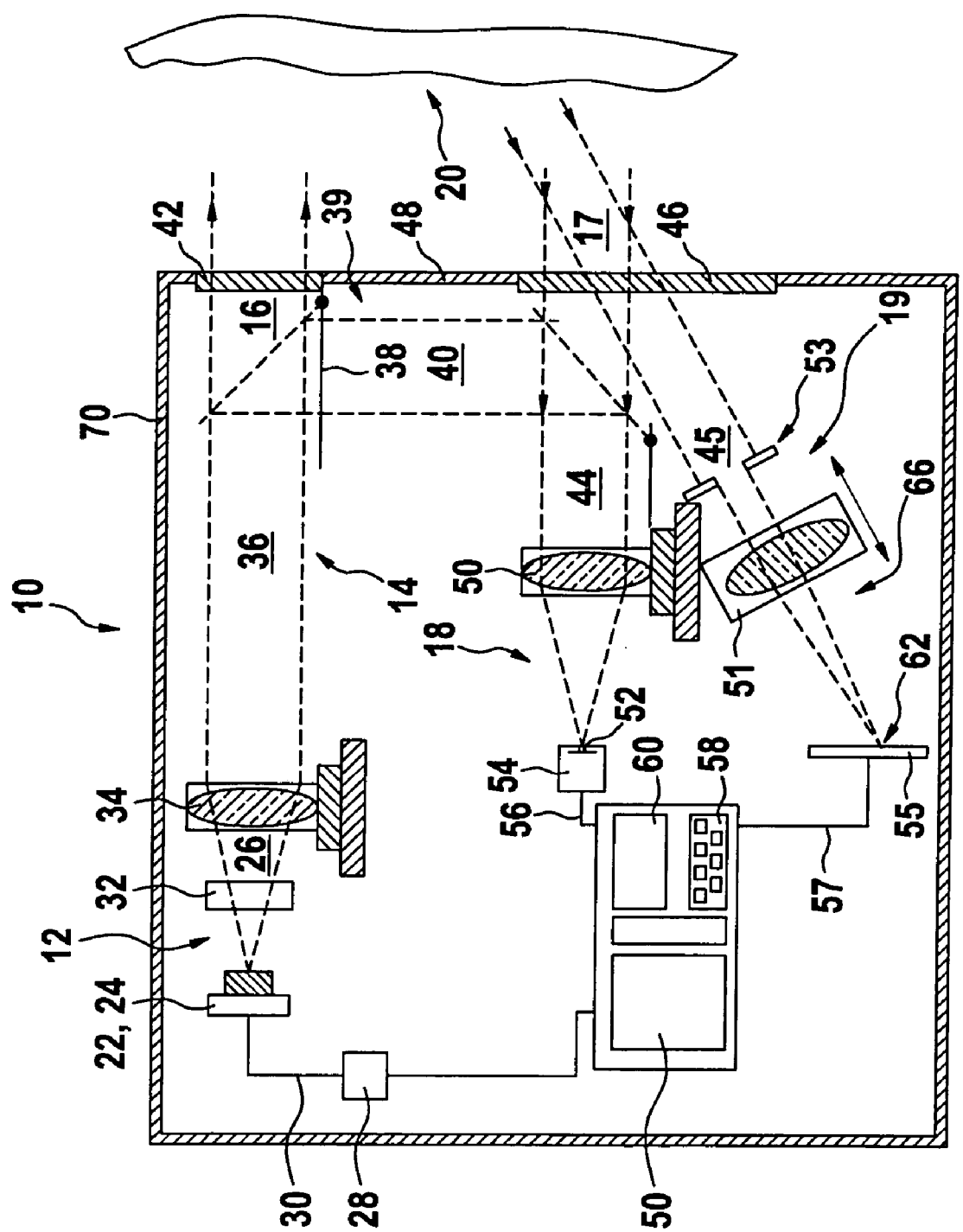
FIG. 1 schematically depicts a device according to the present invention for measuring distance according to the time delay method and FIG. 2 shows a schematic block circuit diagram of another exemplary embodiment of the device according to the present invention.

FIG. 1 schematically depicts an optical distance measuring device 10 with the most important of its components shown in order to describe its basic design. The optical distance measuring device 10 has a housing 70 that accommodates a transmission branch 14 for generating an optical measurement signal 36 and a reception unit 18 for detecting the measurement signal 17 returning from a target object 20.

The transmission branch 14 has a transmission unit 12, which, in addition to a series of components that are not shown, is equipped with a light source 22, which, in the exemplary embodiment shown in FIG. 1, is embodied in the form of a semiconductor laser diode 24. It is also possible, though, to use other light sources in the transmission branch 14 or transmission unit 12 of the device according to the present invention. The laser diode 24 of the exemplary embodiment shown in FIG. 1 transmits a laser beam in the form of a light beam 26 that is visible to the human eye. To achieve this, the laser diode 24 is driven by a control unit 28, which uses a corresponding set of electronics to carry out a modulation of the electrical input signal 30 to the diode 24. The control unit 28 in turn receives the required frequency signals of the laser diode from a control and evaluation unit 58 of the measuring device according to the present invention. In other exemplary embodiments, the control unit 28 can also be integrated directly into the control and evaluation unit 58.

The control and evaluation unit 58 includes a circuit arrangement 59 that has, among other things, at least one quartz oscillator for generating the required frequency signals. The optical measurement is modulated in a known manner using these signals, several different frequencies of which are typically used during a distance measurement. The basic design of such a device and the corresponding method for generating different measurement frequencies can be taken, for example, from DE 198 11 550 C2; for this reason, the above-mentioned document is merely cited here and the contents thereof are viewed as expressly included in the content of this application by reference. Therefore the details of the frequency generation and measurement process are not discussed further in the context of the description to be given here.

The intensity-modulated light beam 26 emerging from the semiconductor laser diode 24 passes through a first set of optics 32 that improve the beam profile of the measurement beam. Such a set of optics is an integral component of modern laser diodes. The measurement beam 26 then passes through a collimation lens 34, which generates a virtually parallel light beam 36.

The transmission branch 14 of the device according to the present invention shown in FIG. 1 is also provided with a device 39 with switching means 38 for generating a device-internal reference path 40 that can be used to calibrate the measuring device. If the switching means 38, which are only depicted symbolically in FIG. 1, are adjusted so that the measurement light beam 36 can be coupled into the reference path 40, then the measurement beam is deflected by means of the reception lens 50 directly onto the detector 54 of the reception unit 18 of the device according to the invention. Because of the very precisely known optical length of the reference path 40, a reference signal thus obtained can be used for calibrating the device according to the invention and in particular for evaluating a phase shift to be determined.

But if the switching means 38 are actuated as shown in FIG. 1, then the measurement signal 36 is coupled out of the housing 70 of the device 10 through an optical window 42. This can, for example, occur through actuation of a control element of the keyboard of the device according to the invention, which control element is not shown in detail in FIG. 1.

The measurement beam 36 then leaves the measuring device 10 in the form of a modulated measurement signal 16 and strikes the desired target object 20, whose distance from the measuring device 10 is to be determined. A certain portion of the signal 17 reflected against or scattered back by the desired target object 20 travels back through an entry window 46 into the housing 70 of the device according to the invention 10. The measurement radiation arriving through the entry window 46 in the end 48 of the device 10 constitutes a returning measurement beam 44, which is deflected onto a reception lens 50. The reception lens 50 focuses the returning measurement beam 44 onto the active surface of a reception device 54.

The reception unit 18 of the device according to the invention has a detector 54, for example a photodiode 52, which converts the incoming light signal 17 into an electrical signal in a known manner. The signal that the detector 54 has converted and is now electronic is then transmitted via corresponding electrical connecting means 56 to a control and evaluation unit 58 of the device 10. Based on the returning optical signal 17 and in particular, the phase shift imparted to the returning signal in comparison to the phase of the originally transmitted signal 16, the control and evaluation unit 58 determines the desired distance between the device 10 and the target object 20. The distance thus determined can be communicated to the user of the device by means of an optical display device 60, for example.

In addition to the embodiment that has been described up to this point, which is used essentially to determine the time delay of the measurement signal between the measurement device 10 and the target object 20, an in particular to determine such a time delay by means of a phase measurement, the device 10 according to the present invention also has an additional reception unit 19 equipped with a triangulation sensor 66. This additional reception unit 19 is essentially comprised of a projection lens 51 for the triangulation and a position-sensitive detector 55. In lieu of the projection lens, it is possible to alternatively provide, or to additionally provide along with the projection lens, a circular aperture 53 as a projection aperture, which assures the required depth of field. The optional circular aperture is likewise shown in FIG. 1.

Whereas the illumination lens 50 for the time delay photo detector 54 should be situated as close to the laser beam 36 as possible in order to minimize parallax errors to the greatest extent possible, the triangulation sensor 66 requires a projection lens 51 that is spaced a certain lateral distance apart from the transmitted measurement beam 36. The projection lens 51 focuses a measurement beam 45 returning from the target object onto the position-sensitive detector 55 and in so doing, allocates it a definite position 62 on the detector surface. Such a detector 55 can, for example, be a row of diodes that extends laterally in the plane defined by the transmission beam 16 and the reception beam 17. It is also possible to use a linear or also a planar detector for the triangulation, extending in two dimensions in the form of a CCD chip (charge coupled device).

In the above-described arrangement of the projection lens 51 or of the projection lens and/or projection aperture 53 and the position-sensitive sensor 55, the incidence point 62 of the focused measurement beam 45 on the position-sensitive sensor 55 is a function of the distance of the target object 20 from the measuring device 10. In an advantageous fashion, an arrangement of the triangulation sensor 66 can be selected such that the incidence point 62 on the detector field is a linear function of the distance between the measuring device 10 and the target object 20.

Through detection and evaluation of the incidence point 62, it is also possible for the additional reception unit 19 to unambiguously determine the desired distance to a target object. To that end, the data regarding the optical incidence point 62 on the triangulation sensor 66 is converted into an electrical signal and transmitted via corresponding connecting means 57 to the control and evaluation unit 58 of the device according to the present invention. Based on the position of the incidence point 62 on the detector and on the known distances of the detector and projection lens 51 from the device housing 70, the control and evaluation unit 58 determines the desired distance between the device 10 and the target object 20, taking into account the corresponding projection properties of the lens 51. The distance thus determined can be communicated to the user of the device by means of the optical display device 60, for example.

Figure 2:
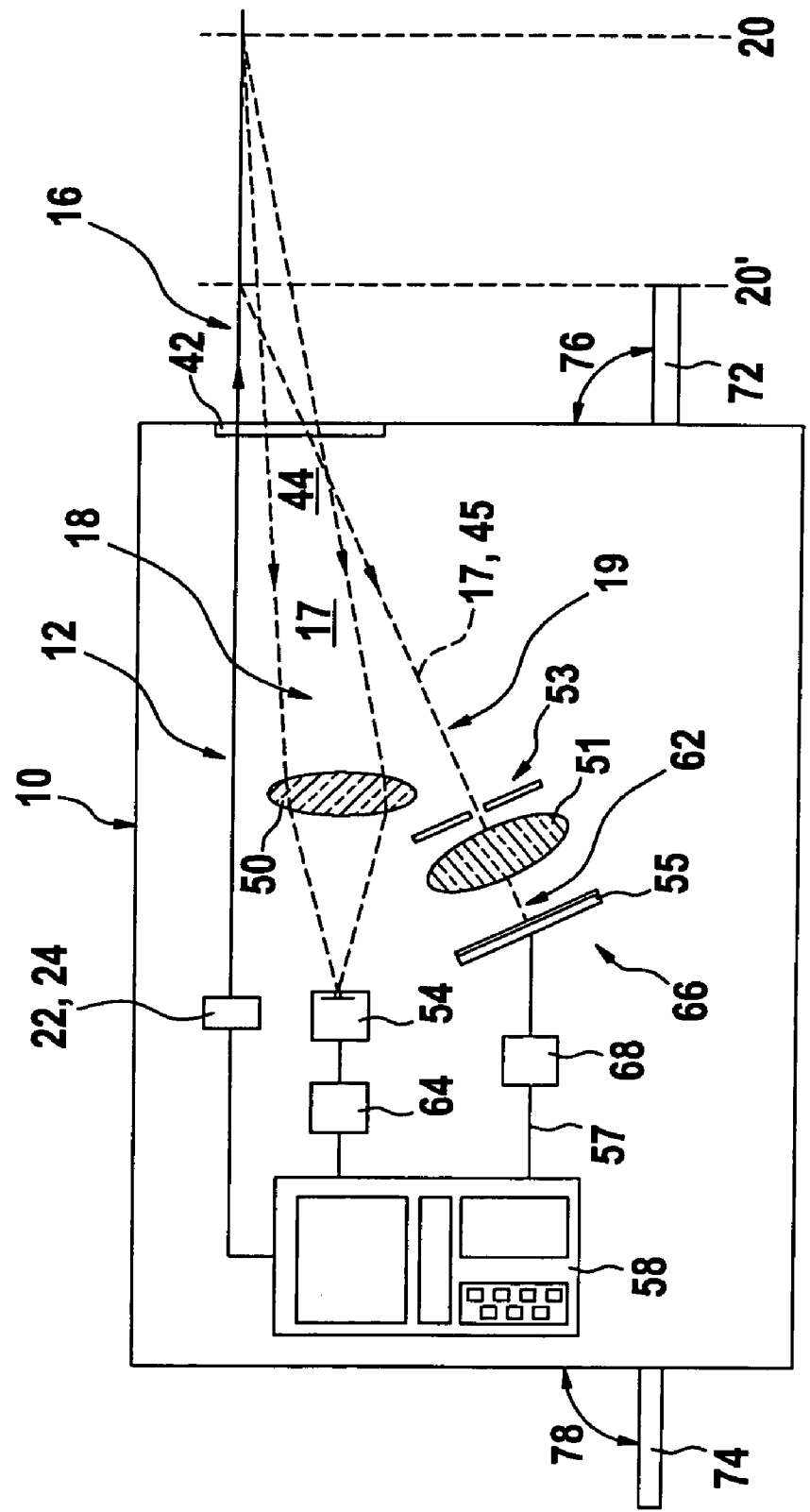

FIG. 2 is a very simplified, schematic depiction of the basic design of the measuring device according to the present invention. A device of this kind can, for example, be integrated into an optical measuring tool and sold in the form of a hand-held optical distance measuring device. The method according to the present invention will now be described in detail with the aid of the depiction in FIG. 2.

The device according to the present invention has a housing 70, which can be the housing of a measuring tool. The housing 70 has a transparent exit window 42, which, in the embodiment form in FIG. 2, also simultaneously serves as an entry window into the device for the measurement radiation returning from the target object. In alternative embodiment forms that are also shown by way of example in FIG. 1, separate exit and entry windows can be used for the measurement radiation. A transmission unit 12 with a modulated light source 22—which in the exemplary embodiment shown is embodied in particular in the form of a laser diode 24 and into which a set of beam-shaping optics 32 and corresponding collimation optics 34 can already be integrated—transmits a measurement beam 16 from the device 10 to a target object 20 or 20'. In order to illustrate the method according to the present invention, two different target objects 20 and 20' are depicted in FIG. 2; the target object 20 symbolizes a target object that is far away from the measuring device 10, i.e. at least in the meter range, and the target object 20' symbolizes a target object that is spaced apart from the measuring device 10 by a distance in the centimeter range or less.

To transmit the measurement radiation from the device 10 to a target object 20 or 20', the device—or a measuring tool that contains the device—is provided with corresponding control elements that can be used to initiate a measuring procedure. Part of the measurement light 17 reflected against or scattered back by a target object 20 or 20' travels back toward the measuring device 10 and enters the measuring device 10 again through the entry window 42 in the form of a measurement beam 44 or 45.

The inside of the measuring device is provided with both a detector 54, which is used to determine the phase shift of the returning measurement signal 17, and a triangulation sensor unit 66, which is essentially comprised of the projection lens 51 and/or is comprised of a projection aperture 53 and a planar detector 55 in addition to the evaluation circuit 68. The photo detector 54 converts the returning measurement beam 44 of the optical measurement signal 17 into an electrical signal and, after a corresponding signal preparation indicated in FIG. 2 by the component 64, can be evaluated by the control and evaluation unit 58 of the device according to the present invention in an essentially known fashion so that the distance of the measuring device 10 from the target object 20 can be calculated based on the relative phase shift between the transmitted measurement signal 16 and the returning measurement signal 17.

Measurement imprecisions can occur in this context, particularly for target objects 20' short distances away from the measuring device 10. For this reason, the triangulation sensor 66 of the additional reception unit 19 of the device according to the present invention—which sensor is essentially comprised of the projection lens 51 and/or the optional projection aperture 53 and the position-sensitive sensor 55—is integrated into the housing 70 of the measuring device 10 in such a way that particularly with short object distances, a returning measurement beam 45 is also detected by the triangulation sensor 66 in order to likewise obtain information regarding the distance between the measuring device and the target object 20' based on the incidence point 62 of the measurement beam 45 in the above-described manner. The circular aperture 53 in the reception branch of the triangulation sensor assures a sufficient projection quality and depth of field over the measurement range of the sensor, which should typically be on the order of a few centimeters. In alternative embodiment forms of the device according to the present invention, there is also the possible option of entirely omitting the projection lens 51 and using the "camera obscura" principle to generate a projection onto the position-sensitive detector 55 merely by means of a circular aperture 53 with an appropriately small opening.

For the triangulation sensor 66 itself, the measurement signal 16 or 17 used for measurement and distance determination does not in principle need to be modulated; it would therefore be possible switch on the modulation for the measurement signal 16 during a triangulation measurement. This would entail a low energy consumption, thus significantly improving the effective operating time of the device, which essentially has no supply cable.

On the other hand, such a modulation of the measurement signal 16 or 17 can also be advantageously used to achieve an effective scattered light suppression for the device 10 in that for the triangulation sensor 66, only light of a particular frequency is detected and only its signal is evaluated. To this end, for example, a corresponding evaluation unit 68 of the device according to the present invention can be used, which is optionally depicted in the exemplary embodiment in FIG. 2, but does not have to be provided in this or other embodiments of the devices according to the present invention. The electronically converted signal of the triangulation sensor 66 can thus, for example, be analyzed with regard to the transmission frequencies used and consequently furnished for further evaluation only for desired modulation frequencies. An electronic signal 57 processed in this manner can then be supplied to the control and evaluation unit 58 of the device according to the invention, evaluated, and correspondingly displayed, for example, on an optical display of an associated measuring device.

In the device according to the present invention, the same light source 22 or 24 is used for both the phase measurement by means of the detector 54 and for the triangulation measurement by means of the linear or for example also planar detector 55. In particular, in certain embodiment forms, the same modulated measurement beam 16 can also be used for determining distance.

In alternative, advantageous embodiment forms of the device according to the present invention, it is also possible to use the same set of reception optics and/or the same reception detector for both the phase measurement and the triangulation measurement. It is thus possible, for example, to use only one position-sensitive detector, for example the detector 55, which can be used for both evaluating the triangulation signal and for evaluating the phase data imparted to the measurement signal.

With the optical distance measurement method according to the present invention, it is advantageously possible to switch back and forth between a phase measurement method and a triangulation method for determining a desired distance between the device and a target object. The user of a measuring tool that contains the device according to the present invention can perform this switching action manually, for example. To that end, the measuring device can be provided with corresponding control elements, which permit a user to select between the different measurement methods for distance measurement. Alternatively, it is also possible to install an automatic system into the measuring device in the form of a control program, which, based on a particular distance, automatically makes a selection as to the best, i.e. most precise, measurement method for determining the desired distance, and/or subjects the result to an evaluation process. To that end, for example, a first, rapid preliminary measurement can be carried out, which gives an initial, rough estimate of the exact distance to be determined. Based on this test measurement, the control and evaluation unit of the measuring device can automatically select the better measurement method. In this context, it is also possible, for example, to predetermine distance limits up to which the measurement should be carried out using the triangulation method. It is alternatively also possible, for example by means of the triangulation sensor itself, to directly generate a signal that initiates a phase measurement and evaluation as soon as the triangulation sensor or a subsequent evaluation unit determines that the appropriate measurement range of the triangulation sensor or for a triangulation method has been surpassed.

The method according to the present invention therefore makes it possible to significantly broaden the measurable range of distances that can be measured with a distance measuring device. In particular, it is possible to open up the range of very short distances between the measuring device and a target object.

It is also possible, as indicated in FIG. 2, to additionally provide the device with one or more mechanical measurement stops 72, 74 of a definite length, which assure a minimum distance of the device from a target object to be measured. An evaluation routine integrated into the measuring device can then be used to take the length of the measurement stop into account in the distance measurement. A measurement stop of this kind can, for example, be telescoped out from the device or can, for example, be folded out from the housing 70 as indicated by the arrows 76 and 78 in FIG. 2, and enables a precise measurement, particularly in the range of minute distances of the measuring device 10 from a target object. It is thus possible, in particular, to measure a distance of zero between the measurement stop of the measuring device and a target object.

The device and method according to the present invention are not limited to the exemplary embodiments shown in the drawings. These drawings are merely intended to illustrate the concepts of the present invention in the form of concrete examples and should be taken as non-limiting.

What is claimed is:

1. A device for optical distance measurement functioning in accordance with the phase measurement principle, having at least one transmission unit (12) equipped with at least one light source (22, 24) for transmitting modulated optical measurement radiation (16) toward a target object (20), and having a reception unit (18) for receiving the optical measurement radiation (17) returning from the target object (20), wherein the device has means (51, 53, 55, 68) that enable a measurement of distances between the device and a target object (20') using a triangulation, wherein the means include the light source (22, 24) of the transmission unit (12).

2. The device as recited in claim 1, wherein the means include at least one position-sensitive sensor (55).

3. The device as recited in claim 2, wherein the position-sensitive sensor (55) is a planar detector.

4. The device as recited in claim 2, wherein the position-sensitive sensor (55) is a linear detector.

5. The device as recited in claim 2, wherein the position-sensitive sensor (55) also has the capacity to be used for time delay measurement of the modulated measurement signal (16, 17, 17') for a phase measurement of the returning measurement signal (17).

6. The device as recited in claim 1, wherein the means (51, 53, 55, 68) include at least one set of projection optics (51).

7. The device as recited in claim 1, wherein the means (51, 53, 55, 68) include at least one circular aperture (53).

8. The device as recited in claim 1, wherein the device has at least one control and evaluation unit (58) for determining a distance of the device (10) from the target object (20, 20') based on the phase shift of the optical measurement radiation (17) returning from the target object (20).

9. The device as recited in claim 1, wherein the device (10) has at least one mechanical, slidable measurement stop (72, 74).

10. A method for optical distance measurement in which it is possible to switch back and forth between a phase measurement method for determining a distance of a distance measuring device from a target object (20, 20') and a triangulation method for determining this distance, wherein the same light source (22, 24) is used for the phase measurement method and the triangulation method.

11. The method for optical distance measurement as recited in claim 10, wherein the same modulated transmission measurement beam (16) is used for the phase measurement method and the triangulation method.

12. The method for optical distance measurement as recited in claim 10, wherein the same detector element (55) is used for the phase measurement method and the triangulation method.

* * * * *